June 30, 1970 E. M. STONER 3,517,586
AUTOMATIC GUN BUFFER ASSEMBLY
Original Filed Sept. 29, 1965 11 Sheets-Sheet 3
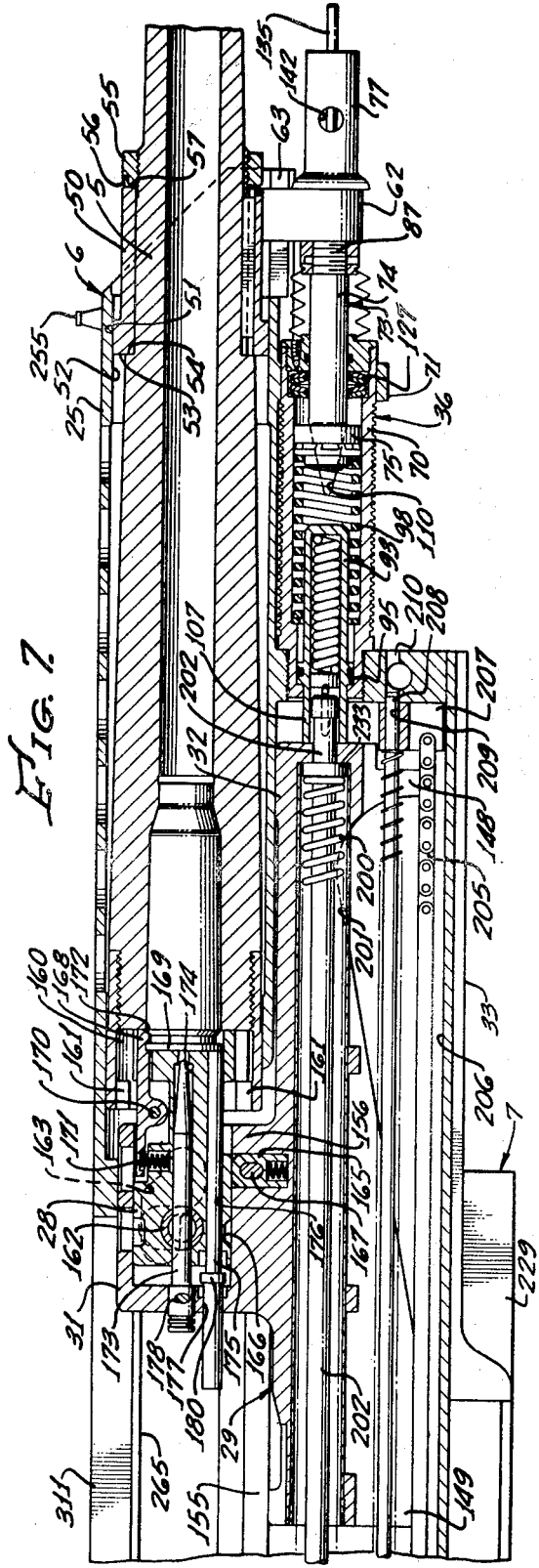
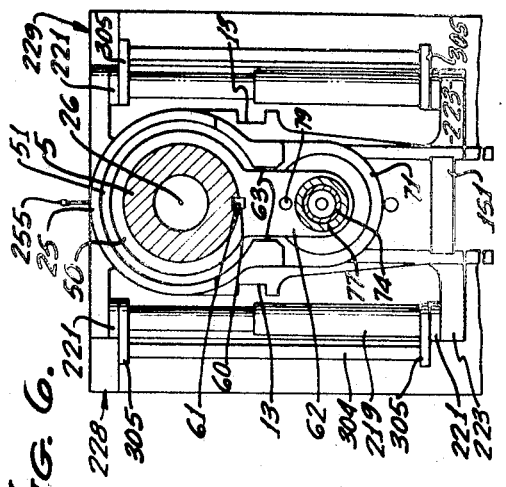
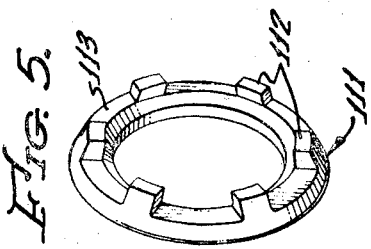
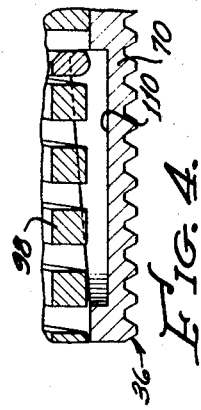
INVENTOR
EUGENE M. STONER June 30, 1970  E. M. STONER  3,517,586
AUTOMATIC GUN BUFFER ASSEMBLY
Original Filed Sept. 29, 1965  11 Sheets-Sheet 4

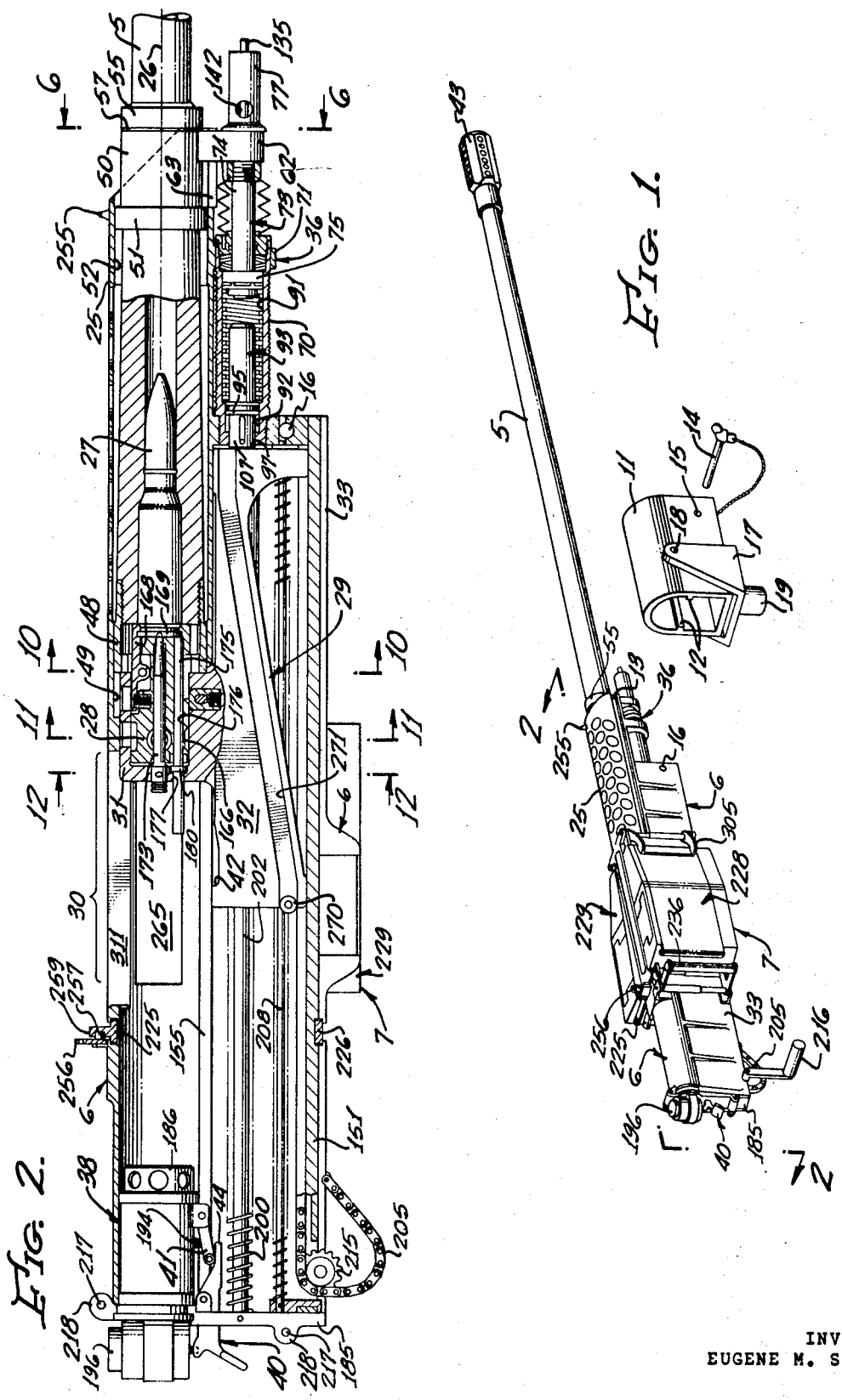

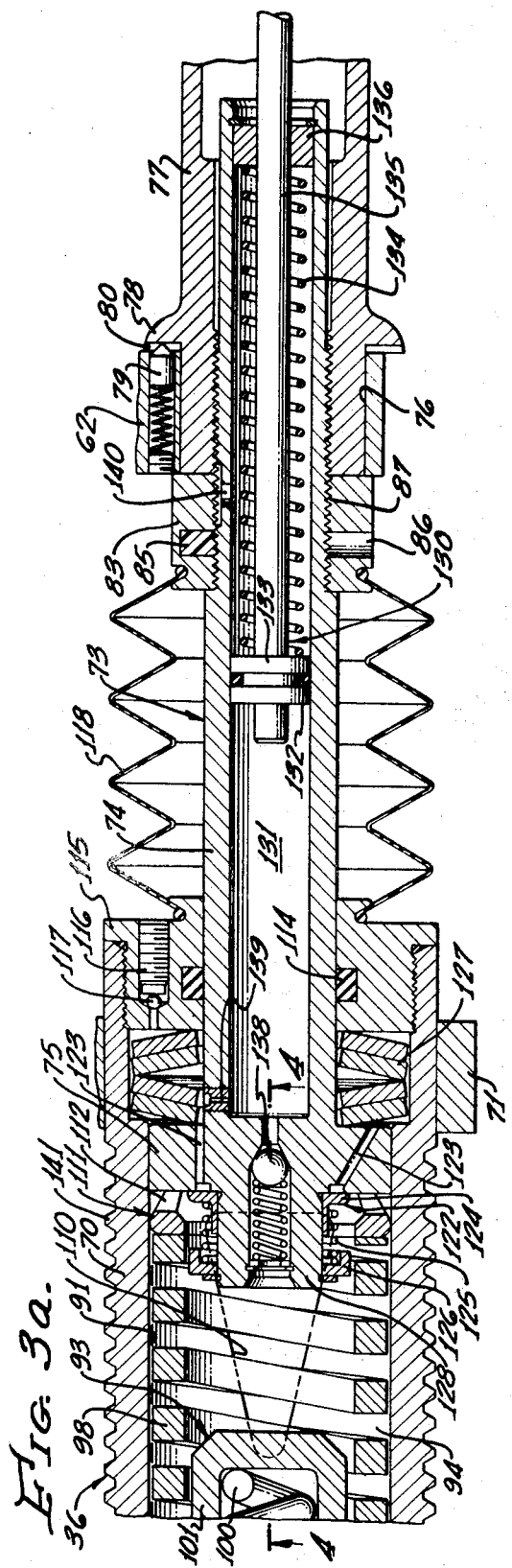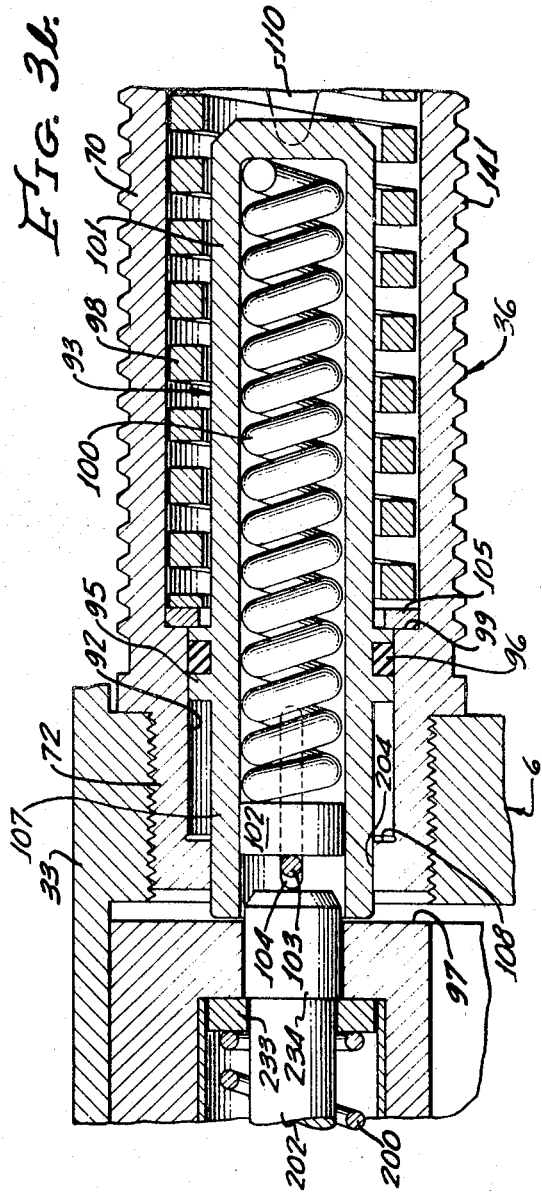

INVENTOR
EUGENE M. STONER

June 30, 1970  E. M. STONER  3,517,586
AUTOMATIC GUN BUFFER ASSEMBLY
Original Filed Sept. 29, 1965  11 Sheets-Sheet 5
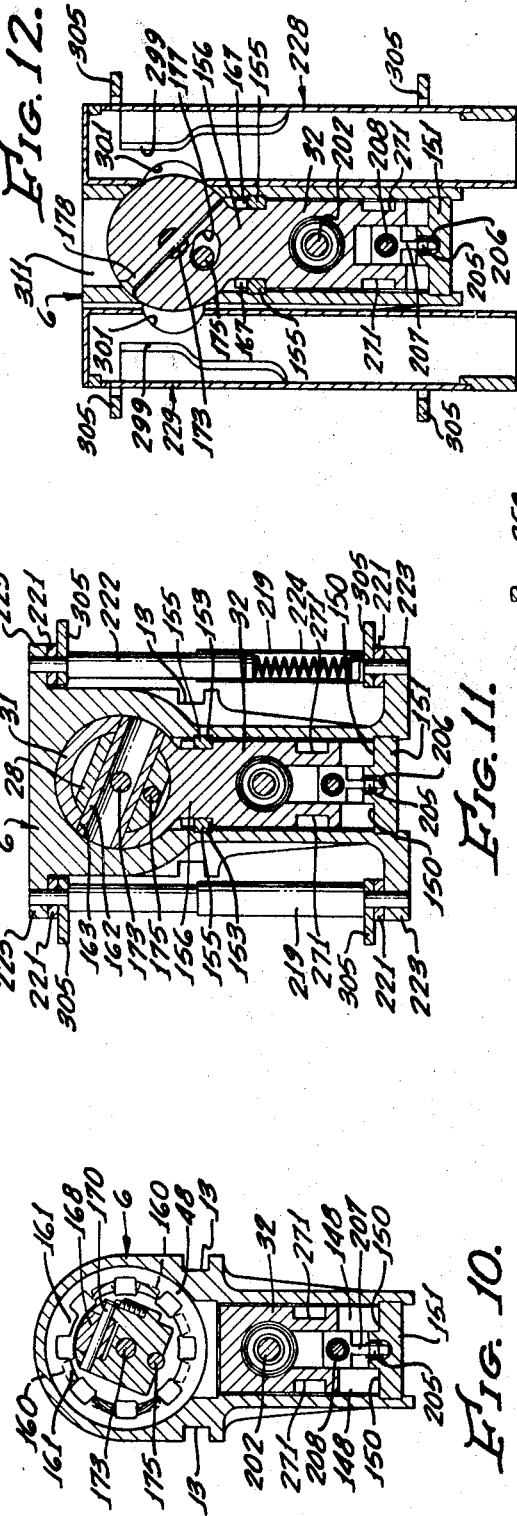
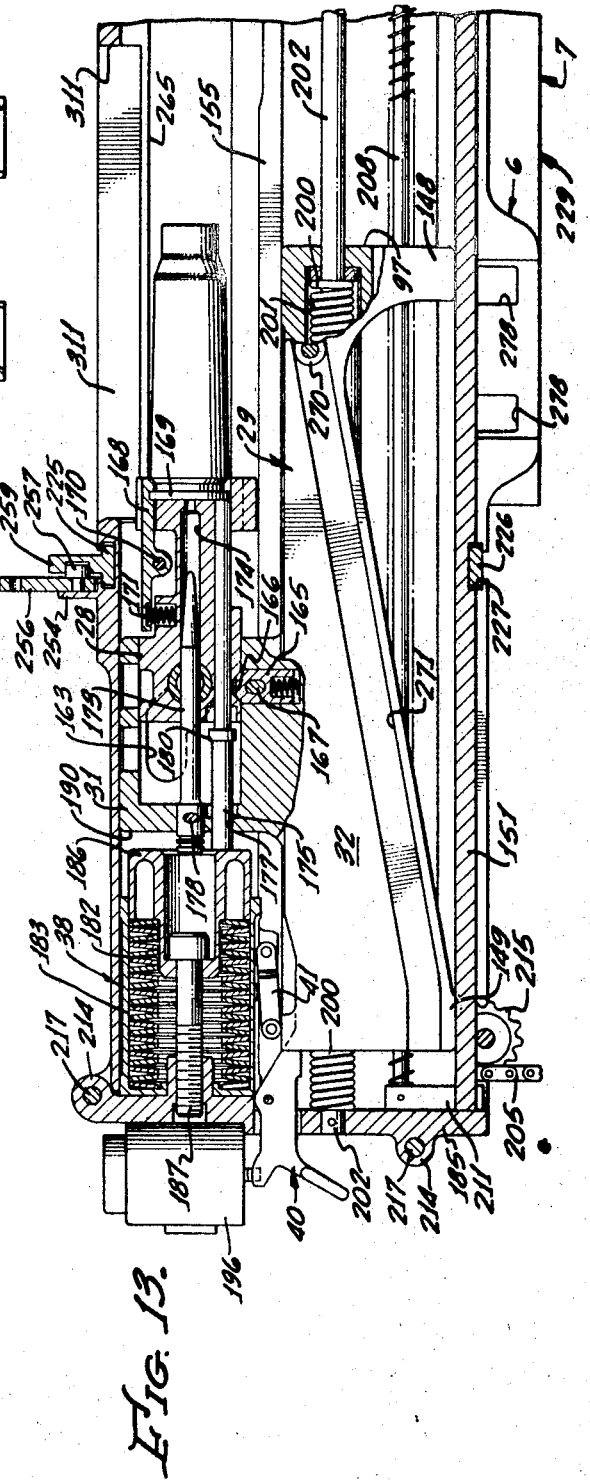
INVENTOR
EUGENE M. STONER

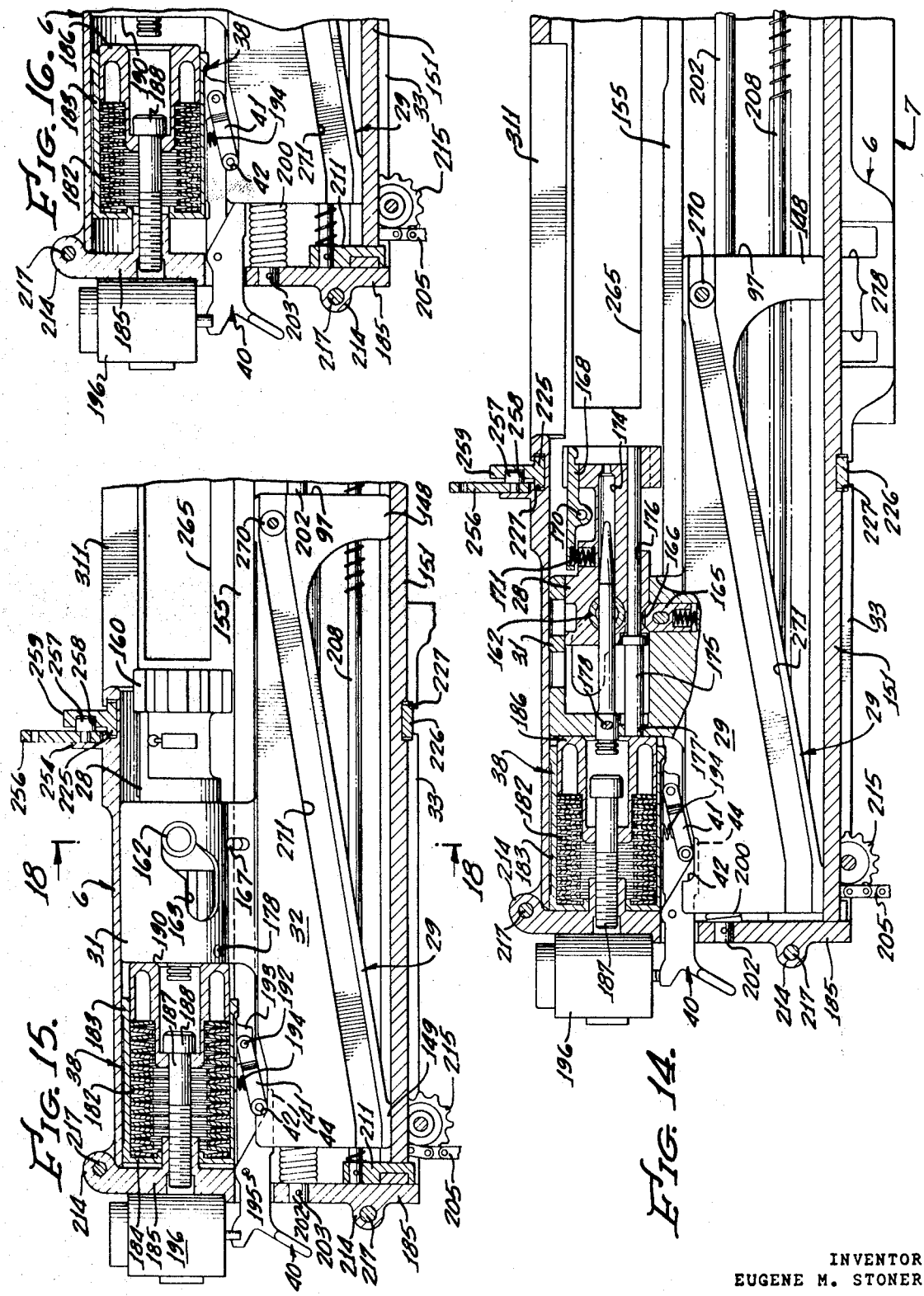

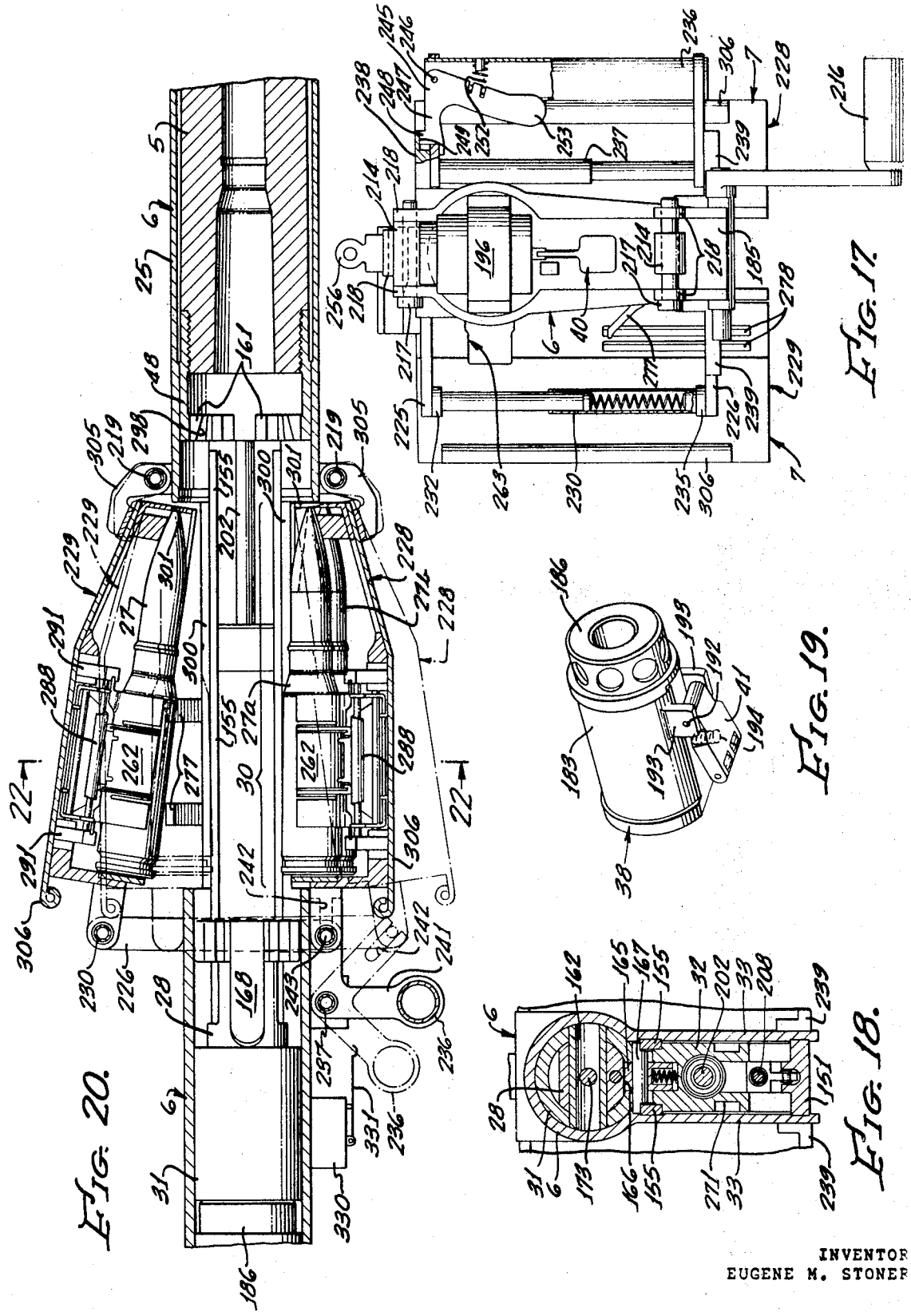

June 30, 1970   E. M. STONER   3,517,586
AUTOMATIC GUN BUFFER ASSEMBLY
Original Filed Sept. 29, 1965   11 Sheets-Sheet 8

INVENTOR
EUGENE M. STONER

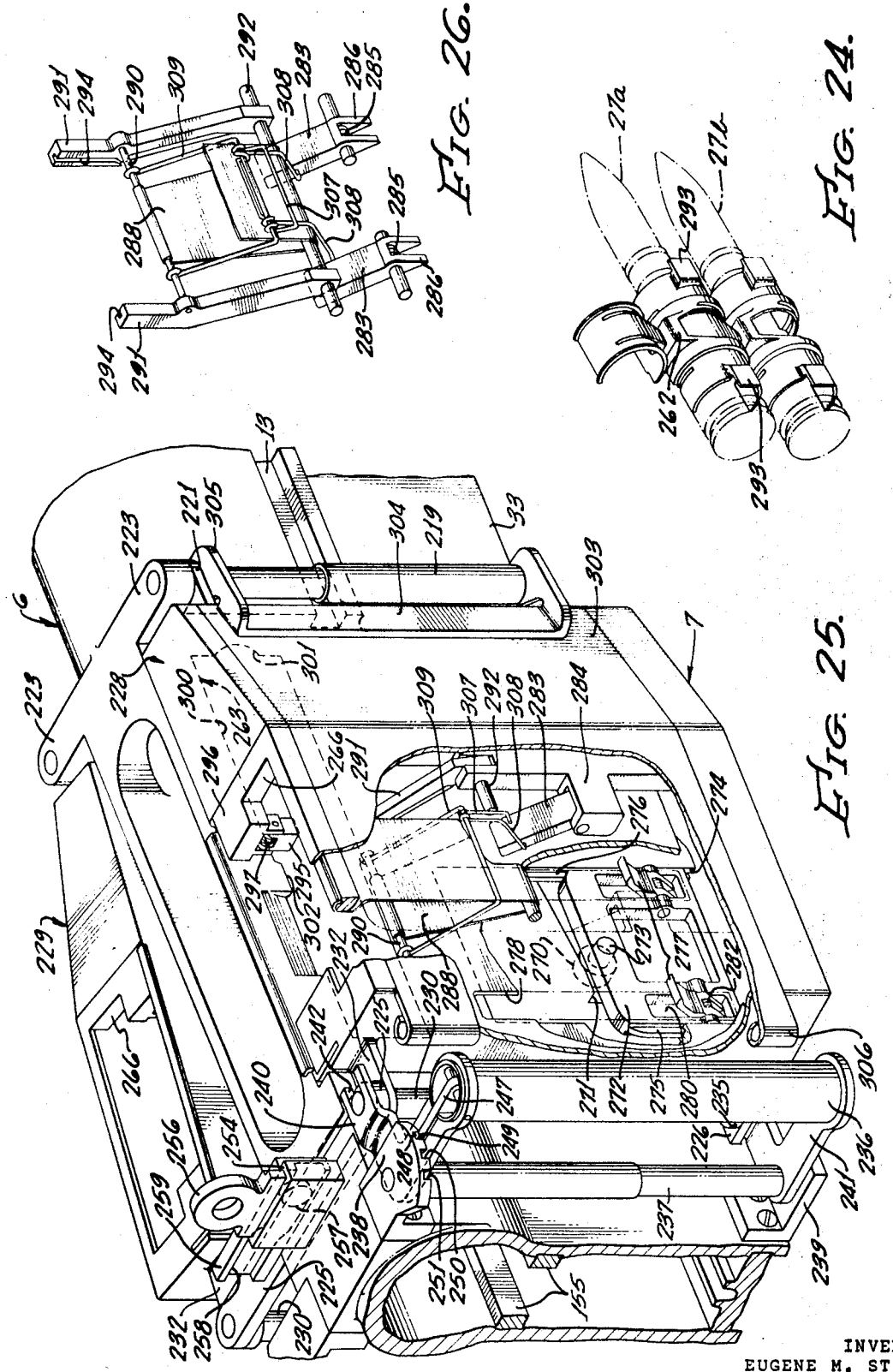

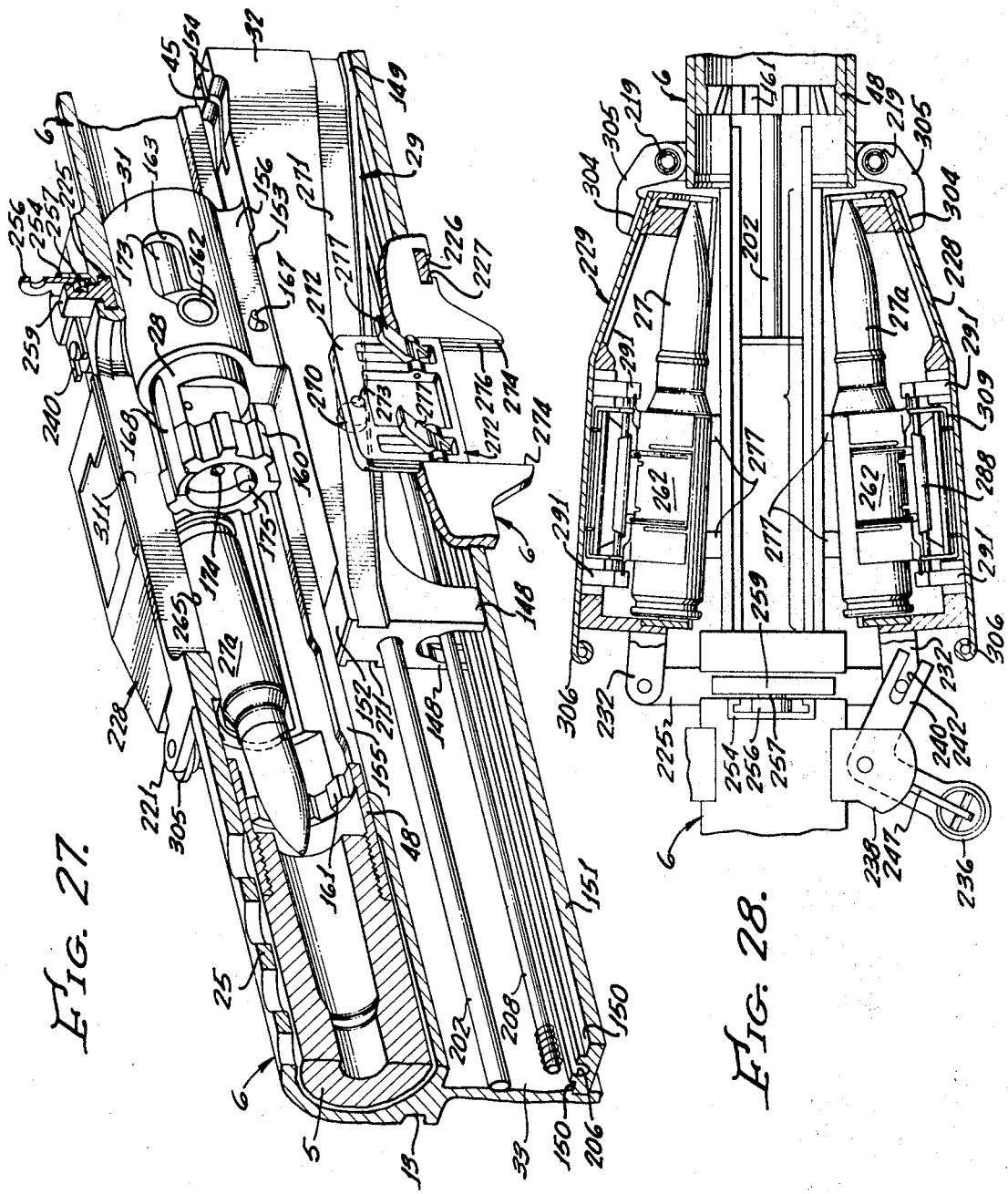

June 30, 1970 E. M. STONER 3,517,586
AUTOMATIC GUN BUFFER ASSEMBLY
Original Filed Sept. 29, 1965 11 Sheets-Sheet 11
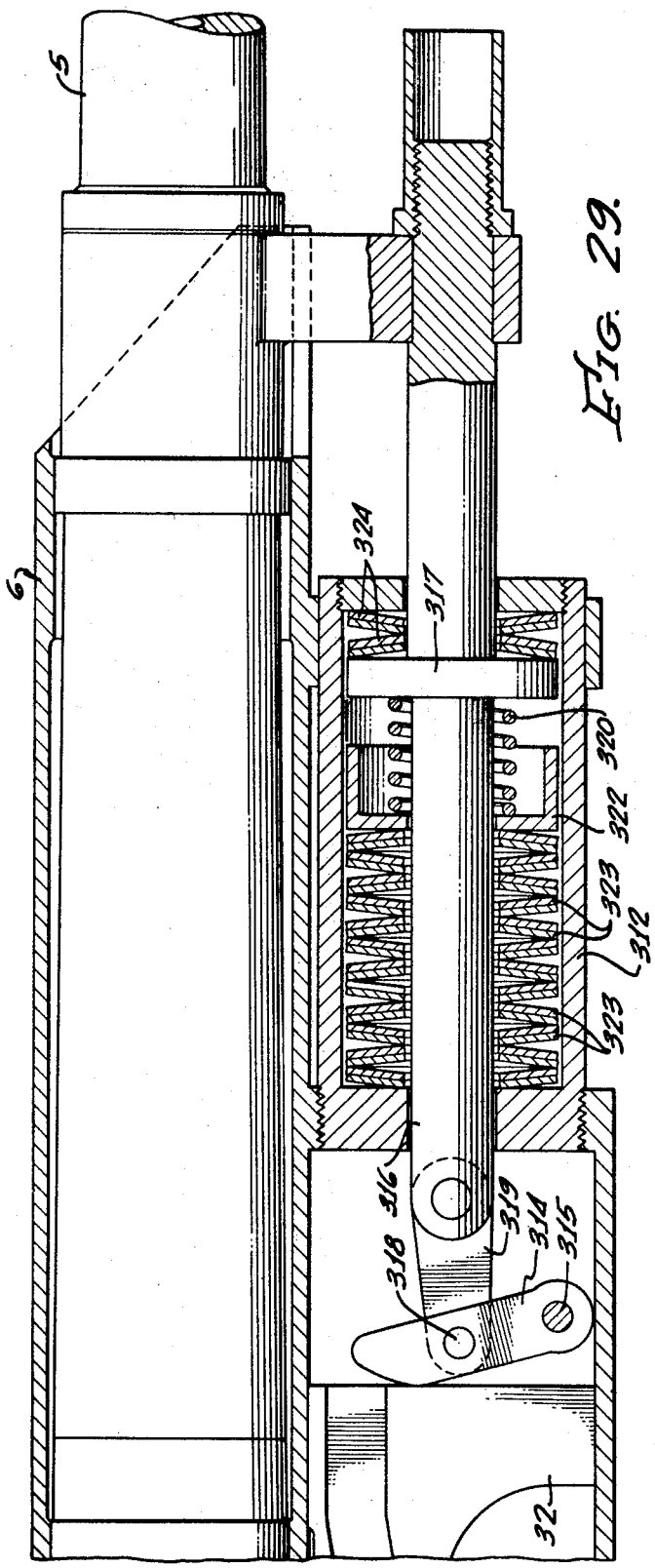
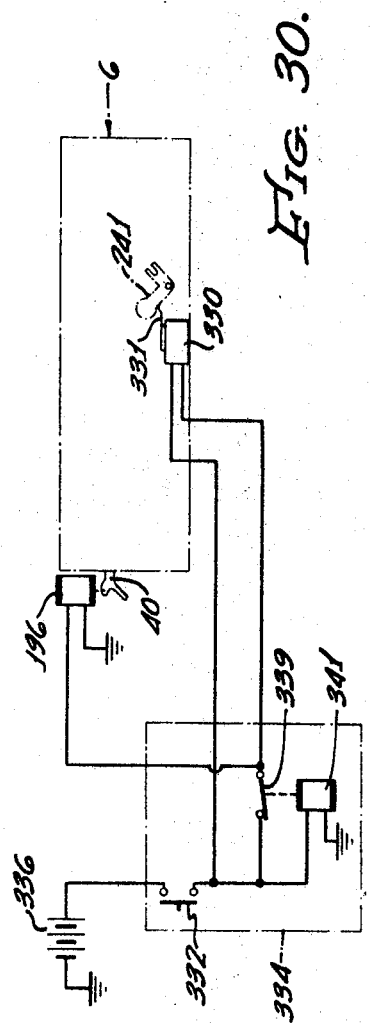
INVENTOR
EUGENE M. STONER ण
United States Patent Office 3,517,586
Patented June 30, 1970

---

3,517,586
AUTOMATIC GUN BUFFER ASSEMBLY
Eugene M. Stoner, Rte. 1, Box 70,
Port Clinton, Ohio 43452
Original application Sept. 29, 1965, Ser. No. 491,300, now Patent No. 3,455,204, dated July 15, 1969. Divided and this application July 22, 1968, Ser. No. 763,448
Int. Cl. F41d 11/12
U.S. Cl. 89—198                                              1 Claim

ABSTRACT OF THE DISCLOSURE

An automatic gun buffer assembly includes spring means which serve the dual function of buffering the bolt carrier in recoil and of buffering the sear engagement.

---

This is a division of application Ser. No. 491,300, filed Sept. 29, 1965, now Pat. No. 3,455,204, issued July 15, 1969.

This invention relates to automatic guns, and more particular, to rapid firing, short recoil-operated, automatic guns.

In order to be suitable for field use, particularly as a military weapon, a rapid-firing automatic gun not only must fire satisfactorily, but also should be easy to repair and maintain in the field with a minimum of tools. Toward this end, the gun should be as simply constructed and have as few parts as is consistent with a high standard of performance.

Further, guns designed to be mounted on military vehicles, e.g. armored cars, should be relatively compact and light as compared with stationary guns. The size of that portion of the gun from the ammunition feeding tray or magazine rearward is particularly critical because the rear end of the gun, including usually the ammunition feeding tray as well, extends within the cupola of the armored car. Since the gun is traversed to aim it, the space which must be allowed for the gun inside the vehicle increases rapidly with the distance from the tray rearward.

The gun which comprises this invention can be field stripped easily and quickly by one man without tools. Many of the parts of the gun serve multiple functions so that the weight, size and complexity of the gun is reduced, maintenance is facilitated, and reliability increased. The parts are arranged to minimize particularly the size of the gun portion which must be contained within a vehicle.

Generally, in accordance with this invention, the automatic gun is recoil-operated. The gun barrel reciprocates axially in a receiver forward of an ammunition feeding station in the receiver. A bolt is reciprocated axially past the feeding station by a bolt carrier which has a relatively short upper portion and a lower portion which is longer than the bolt carrier stroke. A cam follower on an ammunition feeding means cooperates with a cam extending along the length of the bolt carrier lower portion to feed ammunition to the feeding station.

A recoil assembly, which is disposed beneath the barrel and forward of the bolt carrier, is operably coupled between the barrel and receiver for buffering recoil and counter-recoil forces. Further, the recoil assembly is responsive to barrel recoil for engaging the forward end of the bolt carrier lower portion to accelerate the bolt carrier in recoil relative to the barrel. A buffer assembly at the rear of the receiver engages the rear of the bolt carrier upper portion to buffer the recoil force of the bolt and bolt carrier.

In an exemplary embodiment of this invention, a sear assembly at the rear of the receiver, which is selectively engageable with a sear notch on the bolt carrier body to interrupt the forward stroke of the bolt carrier is buffered by the same buffer assembly as buffers the recoil force of the bolt and bolt carrier.

This invention also includes several novel sub-combinations which, while particularly useful in the gun combination described above, are also useful in other automatic rapid firing guns. For example, in accordance with one aspect of the invention, the recoil means includes a fluid cylinder fixed to the receiver and located below the barrel in alignment with the lower portion of the bolt means. The internal walls of the cylinder define a large diameter forward portion in which a recoil piston reciprocates, and a smaller diameter rearward portion in which an accelerator piston reciprocates. The recoil piston is fixed to the barrel, and the accelerator piston engages the forward end of the bolt carrier lower portion to accelerate it in recoil relative to the barrel.

The accelerator piston bottoms out after the barrel has completed an initial part of its recoil movement, and a restricted bypass opening permits the recoil piston to continue forward a short distance, buffering the barrel recoil force.

This invention further includes a selective ammunition feeding system particularly useful with the gun described above, but also useful with other guns. Prior art automatic guns commonly used by the military have used a single store of ammunition for feeding the gun. Since different types of targets require different types of ammunition, e.g. high explosive ammunition for personnel, and armor piercing ammunition for armored vehicles, such prior art guns have created problems. Often such prior art guns used a single type of ammunition which was a compromise between the types desired, or was designed to be effective against only a limited type of target. Other times, plural types of ammunition were mixed on a single feed belt so that all types of ammunition were fired at all targets. It is evident that neither of these situations was satisfactory.

The selective feeding feature of this invention permits rapid selection of the proper type of ammunition for each target, thus increasing the flexibility of the gun and eliminating wasteful firing of ineffective rounds. Generally in accordance with this aspect of the invention, the ammunition feed means is coupled to rounds of ammunition from a plurality of different stores, and includes a selector means for selecting any one of the ammunition stores to supply ammunition to the receiver.

In an exemplary embodiment, the bolt means which reciprocates longitudinally in the receiver past the feeding station has a relatively short upper portion and a relatively long lower portion, the length of the lower portion exceeding the stroke of the bolt means. An elongate cam slot is formed in each of two opposite sides of the lower portion of the bolt means. The ammunition feeding means has a pair of cam followers each of which cooperates with a respective one of the cam slots to operate an ammunition feed pawl means. Each ammunition feed pawl means is effective to feed ammunition from a different store, and the selector means are operative to alternatively select either of the ammunition stores.

As the optimum ballistic characteristics for each type of ammunition often differ, the ballistic characteristics of the ammunition in each of the plural stores will often be different. In yet another aspect, this invention takes these differing characteristics into consideration by providing a gun sight means which is automatically adjusted responsive to the store selected.

These and other objects and features of this invention will be apparent from the following description when read with reference to the accompanying drawings in which:

FIG. 1 is a perspective view showing the preferred embodiment of a gun constructed in accordance with this invention;

FIG. 2 is an enlarged sectional view taken generally along lines 2—2 of FIG. 1;

FIGS. 3a and 3b are fragmentary, enlarged side views, in section, showing portions of the recoil assembly illustrated in FIG. 2;

FIG. 4 is a sectional view taken generally along lines 4—4 of FIG. 3a;

FIG. 5 is a perspective view showing a part of the recoil assembly removed from the gun;

FIG. 6 is a sectional view taken generally along lines 6—6 of FIG. 2;

FIGS. 7–9 are fragmentary, enlarged side views, in section, showing the central portion of the gun illustrated in FIG. 1 in successive stages of the firing cycle;

FIG. 10 is an enlarged sectional view taken generally along lines 10—10 of FIG. 2;

FIG. 11 is an enlarged sectional view taken generally along lines 11—11 of FIG. 2;

FIG. 12 is an enlarged sectional view taken generally along lines 12—12 of FIG. 2;

FIGS. 13–16 are fragmentary, enlarged side views, in section, showing the rear portion of the gun illustrated in FIG. 1 in successive stages of the firing cycle;

FIG. 17 is an enlarged, rear elevation view of the gun illustrated in FIG. 1 with portions cut away;

FIG. 18 is a sectional view taken generally along lines 18—18 of FIG. 15;

FIG. 19 is a perspective view of the rear buffer and sear assembly removed from the gun;

FIGS. 20 and 21 are fragmentary, enlarged top views, in section, showing the central portion of the gun illustrated in FIG. 1, and particularly illustrating the ammunition feeding means in successive stages of the firing cycle;

FIG. 24 is a perspective view of a portion of an ammunition belt removed from the gun;

FIG. 25 is a fragmentary, perspective view of the ammunition feeding means with portions cut away;

FIG. 26 is a perspective view of a portion of the ammunition feeding means removed from the gun;

FIG. 27 is a fragmentary perspective view, in vertical, longitudinal section, showing the central portion of the gun in the counter-recoil part of the cycle;

FIG. 28 is a fragmentary top view, in section, similar to FIGS. 21 and 22, but showing the ammunition feed selector in an intermediate position;

FIG. 29 is a side view, in section, showing an alternative embodiment of the recoil assembly; and, FIG. 30 is a diagram of a circuit for selecting a fully automatic or semi-automator firing cycle responsive to the ammunition feed selector.

Figure 8:
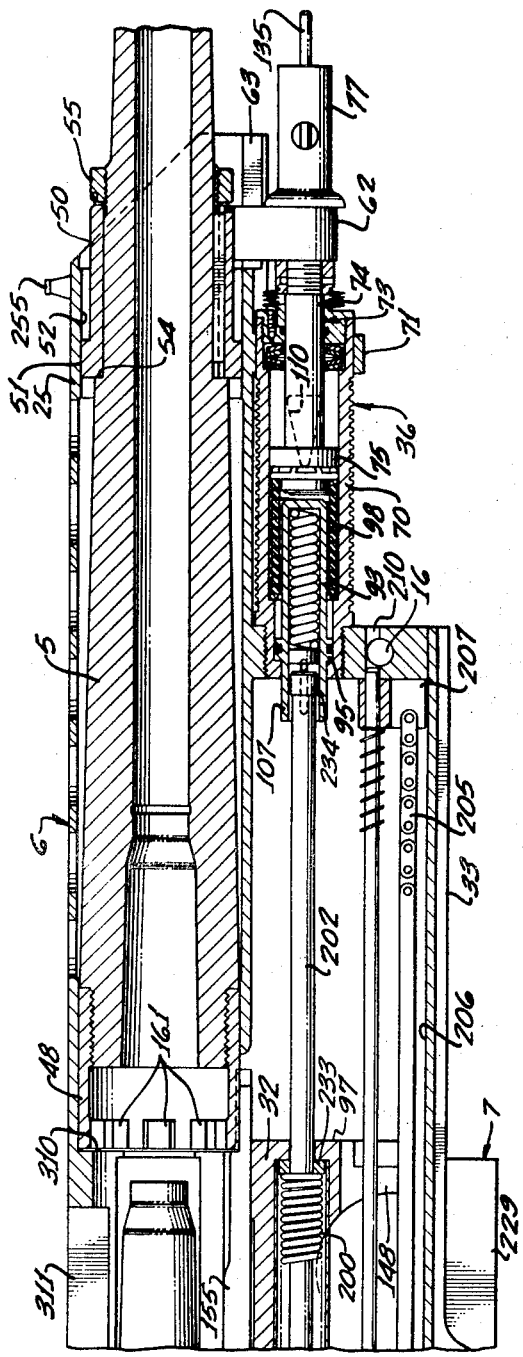

Referring to FIGS. 1, 2 and 6, an automatic gun is shown, including a barrel 5, a receiver 6, and ammunition feeding means 7. The gun is mounted, e.g. on a vehicle such as a military armored car, by an exemplary means which includes a collar 11 having internal rails 12 which fit into conforming external grooves 13 on the side of the receiver. A removable pin 14 extends through aligned apertures 15, 16 in the collar and receiver 6 to fix the gun longitudinally with respect to the collar. The collar 11 is supported on a horizontal pivot pin 18 in a yoke 17. A vertical pin 19 extends from the base of the yoke for mounting the same on a vehicle (not shown) for pivotal movement about a vertical axis. Thus, the gun is positively fixed against sliding movement relative to the vehicle, but may be pivoted to aim the gun.

The barrel is mounted for reciprocal movement along the axis 26 of its bore in the forward portion of an elongate, generally cylindrical, upper part 25 of the receiver. A bolt means is provided for chambering, firing and ejecting rounds of ammunition 27. The bolt means includes a bolt 28, which is aligned with the barrel axis, and a bolt carried 29 which is attached to the bolt and reciprocates longitudinally in the receiver past an ammunition feeding station 30 located rearward of the barrel. The bolt carrier 29 has a relatively short upper sleeve portion 31 which carries the bolt, and a relative long, lower body portion 32 which is housed in a lower, generally rectangular, part 33 of the receiver.

A recoil assembly 36 located beneath the barrel is operably coupled between the barrel and the forward end of the receiver lower part 33 for buffering recoil and counter-recoil forces. The recoil assembly is aligned with the body 32 of the bolt carrier and engages its forward end to accelerate the bolt carrier 29 in recoil relative to the barrel.

The recoil force of the bolt 28 and carrier 29 is buffered by a buffer assembly 38 at the rear of the receiver which engages the rear of the bolt carrier sleeve 31 near the end of the recoil stroke. A sear 41 pivotally connected to the buffer assembly 38 engages in a sear notch 42 on the bolt carrier body 32 to interrupt counter-recoil movement of the bolt and bolt carrier and retain them in the rearward cocked position. Depression of a trigger mechanism 40 raises the sear 41 out of engagement with the notch 42 to fire the gun.

A muzzle break 43 is connected on the forward end of the barrel to permit gas to escape rearwardly through openings in the break.

Figure 9:
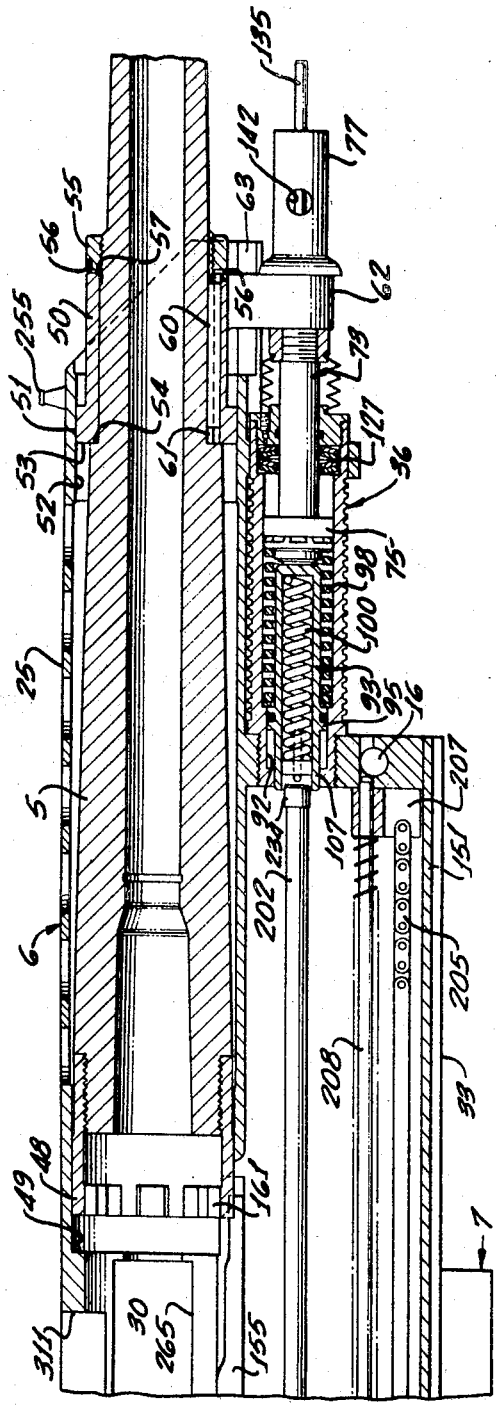

Referring now to FIGS. 6 and 9, as well as to FIG. 2, a breech barrel extension 48 is threaded onto the rear of the main barrel portion. The external surface of the barrel extension forms a bearing surface which slideably engages an internal bearing surface 49 in the upper forward portion 25 of the receiver. A collar 50 affixed around the barrel also has an external bearing surface 51 which slideably engages a corresponding internal bearing surface 52 in the froward end of the upper forward receiver portion 25 to support the barrel. A shoulder 53 at the forward end of the barrel collar 50 abuts a shoulder 54 intermediate the ends of the barrel, and a nut 55 threaded onto the barrel forward of the collar holds the collar in place longitudinally. Tabs 56 on a lock washer 57 between the nut 55 and the collar 50 are bent in opposite directions into detents on the collar and nut to retain the nut 55 against accidental loosening. The collar is fixed against rotation relative to the barrel by an internal longitudinal key 60 on the collar which is inserted in a corresponding keyway 61 formed in the barrel. A lug 62 which depends downwardly from the collar, extends through a forwardly open guide slot 63 in the receiver, and engages the sides of the guide slot to fix the collar 50 and barrel against rotation relative to the receiver, while permitting axial reciprocation.

Referring particularly to FIGS. 2, 3a and 3b, the recoil assembly 36 includes a recoil cylinder 70 the forward end of which extends through an ear 71 depending from the receiver 6 and the rear end 72 of which is threaded into the front of the receiver lower part 33, so that the cylinder extends parallel to and below the barrel axis 26 in alignment with the bolt carrier body 32. The recoil cylinder 70 houses a recoil piston 73 which has a piston head 75 and piston rod 74 extending forward from the head and on through an aperture 76 in the depending portion of the barrel collar lug 62. A sleeve nut 77, threaded onto the piston rod 74 has an external flange 78 which abuts the barrel collar lug 62 to retain it on the piston rod. Accidental loosening of the sleeve nut 77 is prevented by a spring biased plunger 79 which engages in any of a plurality of detents 80 formed around the flange 78 of the nut. An adjusting nut 83 on the piston rod rearward of the collar lug 62 accurately locates the longitudinal position of the barrel relative to the receiver and recoil mechanism. An arcuate piece of resilient material 85 is wedged into a tapered arcuate slot 86 in the adjusting nut to hold it at any selected place of adjustment along the threads 87 of the piston rod.

The sleeve nut is knurled on its external surface so as to facilitate its removal by hand. With the sleeve nut 77 removed, the barrel may be freely slid out the forward end of the receiver.

Because the recoil piston rod 74 is fixed to the barrel 5 by the sleeve nut 77 and adjusting nut 83, the recoil piston head 75 reciprocates rearwardly and forwardly with the barrel in recoil and counter-recoil, respectively.

The recoil piston head reciprocates in a front bore 91 of relatively large internal diameter in the recoil cylinder 70, and an accelerator piston 93 reciprocates in a rear bore 92 of smaller internal diameter in the cylinder. The accelerator piston 93 includes a piston head 95 sealed by an O-ring seal 96. The interior of the recoil cylinder, between the recoil piston head 75 and the accelerator piston head 95, is filled with hydraulic fluid so that as the recoil piston moves rearwardly in recoil, the smaller diameter accelerator piston 93 is driven rearwardly at an increased velocity.

The accelerator piston 93 is hollow. It has a closed forward extension 101 protruding forward from the piston head 95 and also has an open rear extension 107 which protrudes rearwardly from the piston head 95. In recoil, the rear extension 107 of the accelerator piston engages the aligned forward end 97 of the bolt carrier body 32 to push the bolt carrier 29 rearward from the battery position illustrated in FIG. 2. Rearward movement of the accelerator piston is limited by an interior shoulder 108 at the rear end of the recoil cylinder.

A heavy recoil spring 98 interior of the recoil cylinder is compressed between a shoulder 99 in the cylinder wall and the recoil piston head to urge the recoil piston 73 forward. The accelerator piston 93 is urged forward by a lighter return spring 100, which is housed in the hollow accelerator piston and the closed forward extension 101 thereof nested within the recoil spring 98. The accelerator spring 100 is compressed between the closed forward end of the accelerator piston and a plug 102. The plug 102 is slideably mounted within the rear extension 107 of the accelerator piston and abuts a stop pin 103 which is fixed to the recoil cylinder 70 and extends through an elongate slot 104 in the rear extension of the accelerator piston. In its forward position, the accelerator piston head 95 abuts an annular ring 105 interposed between the shoulder 99 and the recoil spring 98. Since the recoil spring is considerably stronger than the accelerator spring, this limits forward movement of the accelerator piston.

A wedge-shaped, or tapered, throttling groove 110 (FIGS. 3a and 4) is formed in the wall of the large diameter part of the recoil cylinder. The throttling groove 110 permits a programmed amount of fluid to bypass the recoil piston head after the recoil piston head has moved a selected distance rearward in recoil. An annular spacer 111 (FIGS. 3a and 5) having forwardly extending spaced-apart fingers 112 is interposed between the forward end of the recoil spring and the recoil piston head to provide radial passageways 113, assuring that fluid communication between the throttling groove 110 and the fluid in the chamber portion rearward of the piston head 75 is not blocked off by compression of the recoil spring 98. Sealing of the bypass 110 is a particular problem because the high acceleration encountered in rapid firing automatic guns causes the recoil spring to compress dynamically, with the greatest amount of compression in the forward portion adjacent the recoil piston head at the initial stages of recoil.

The chamber within the recoil cylinder 70 is sealed at the rear end by the accelerator piston head seal 96. At the forward end, the chamber is effectively terminated by a threaded plug 115 through which the recoil piston rod 74 extends in engagement with an O-ring seal 114. The recoil piston head 75 divides the chamber within the recoil cylinder into a rear chamber and a forward chamber. The recoil piston head is approximately the same diameter as is the forward bore 91, but there is no seal between the piston head and bore. Air may be bled from the cylinder chamber by backing off a set screw 116 to unseat a ball valve 117 in the plug 115.

A bellows-type cover 118 extends between the plug 115 and the adjusting nut 83 to enclose the extended sealing surface of the recoil piston rod 74.

The recoil piston head 75 has a check valve 122 formed thereon to facilitate the return of the barrel to battery position in time to receive the next round. The check valve 122 opens on forward movement of the recoil piston to permit fluid to flow rearwardly through a plurality of small orifices 123 in the recoil piston head. The valve 122 includes an annular flapper ring 124 which is seated by a spring 125 compressed against an outwardly extending shoulder or cap 126 fixed on a central rear extension 128 on the recoil piston head, to seal the orifices 123 except during forward movement of the piston head.

Belville or cup counter-recoil springs 127 stacked in series-parallel forward of the recoil piston head cooperate with the piston head and the plug 115 to buffer counter-recoil forces.

The recoil piston rod 74 is hollow to provide a reservoir for replenishing hydraulic fluid in the chamber of the recoil cylinder, and to accommodate thermal expansion of the fluid. A replenisher piston 130 is slideable in the reservoir chamber 131 and sealed by an O-ring 132 around the piston head 133. The replenisher piston is biased rearwardly by a replenisher spring 134 which surrounds the replenisher piston rod 135 and abuts a cap 136 retained in the forward end of the recoil piston rod 74.

If the volume of hydraulic fluid in the recoil cylinder decreases, either through temperature decrease or leakage, the differential pressure between the reservoir 131 and the main chamber 94 opens a spring-biased ball check-valve 138 in the piston head to provide a conduit through which fluid may flow to replenish the supply in the recoil cylinder.

On the other hand, as the temperature of the hydraulic fluid in the recoil cylinder increases, the hydraulic fluid seeps forward around the recoil piston head, which is not sealed against the walls of the chamber. It passes through a small bleed hole 139 in the wall of the recoil piston rod and into the replenisher reservoir, thus forcing the replenisher piston 130 forward against the replenisher spring. The replenisher spring 134 is considerably weaker than the accelerator spring 100, so that expansion of the hydraulic fluid will cause the replenisher piston, rather than the accelerator piston 93 to move.

If expansion of the fluid is great enough, the replenisher piston moves forward of a radial outlet 140 through the side of the recoil piston rod so that fluid seeps out between the threads of the adjusting nut 83 and the recoil piston rod. The external surface 141 of the recoil cylinder is circumferentially ridged to provide an increased cooling surface, and decrease the likelihood of overexpansion.

Because the bleed hole 139 is quite small and the recoil cycle time is extremely short, the replenisher piston does not move substantially under the influence of the instantaneous pressure increase in the main fluid chamber 94 caused by recoil of the recoil piston.

The distance which the replenisher piston rod 135 extends forward out of the recoil piston rod 74 is proportional to the quantity of hydraulic fluid in the recoil cylinder; hence, the replenisher piston rod serves as a dipstick to indicate the supply of fluid by index marks (not shown) on the dipstick which are visible through an aperture 142 in the sleeve nut 77.

Referring particularly to FIGS. 10–12 and 27, as well as FIG. 2, as the bolt carrier 29 reciprocates, two laterally spaced legs 148 on the forward end of the bolt carrier body 32, and two laterally spaced legs 149 on the rear of the body 32 are guided in longitudinal trackways 150 formed in the bottom plate 151 of the receiver 6. Raised bearing surfaces 152, 153 and 154 located on the upper side of the body 32 at the forward end, the center 153, and the rear end 154 thereof respectively, slidingly engage the bottom surface of parallel elongate guide rails 155 which are mounted interior of the sides of the receiver. The sides of a neck portion 156 of the bolt carrier, which integrally connects the upper sleeve portion 31 to the lower body portion 32, bear against the sides of these rails 155 to fix the top of the bolt carrier laterally with respect to the receiver. Thus, as the bolt carrier reciprocates longitudinally in the receiver, the guides maintain the bolt in axial alignment with the barrel.

Referring particularly to FIGS. 7, 10 and 27, external locking lugs or teeth 160 at the forward end of the bolt engage with internal locking lugs or teeth 161 at the rear end of the barrel extension to lock the bolt to the barrel when the bolt is in battery. When the bolt is rotated from the locking position to a position in which the teeth 160 on the bolt are aligned with the spaces between the teeth 161 on the barrel extension, the bolt is unlocked and may be reciprocated rearwardly away from the barrel.

Referring now particularly to FIGS. 7, 11 and 27, the bolt 28 is inserted in the sleeve portion 31 of the bolt carrier for axial and rotative movement, and connected to the sleeve by a cam follower pin 162 extending through the bolt and into radial surface cam slots 163 on opposite sides of the bolt carrier sleeve. The cam pin is held in place by the interior walls of the receiver 6. The forward and rearward portions of the cam slots are parallel to the barrel axis to permit limited axial movement of the bolt in the carrier sleeve—with the bolt in the aligned position when the cam follower pin 162 is in the forward portion of the slots and in the locked position when the cam follower pin is in the rear portion. The central portion of the cam slot is oblique to the bolt axis to rotate the bolt between the locking position and the aligned position. Thus, as the bolt carrier body is accelerated rearwardly relative to the barrel by the recoil mechanism 36, the cam follower pin cooperates with the cam slot to rotate the bolt to the aligned position, and then carry the bolt rearward with the bolt carrier.

When the bolt leaves the barrel it is in the aligned position, and is extended forward in the sleeve. As is shown in FIGS. 7, 13 and 18, a spring-biased crevice pin 165, mounted in the bolt carrier neck and sleeve for radial movement with respect to the barrel axis, is urged upward into a notch 166 in the bolt to hold the bolt forward in the sleeve, and therefore in the aligned position. A cam follower or ramping pin 167 extends outwardly from the crevice pin 165 and rides on elongate cam surfaces formed on the top of the guide rails 155 to hold the crevice pin in the upward, engaged position after the bolt is out of battery so that the bolt remains extended despite forces on it from stopping the bolt carrier at the rear of the receiver and from stripping rounds during the counter-recoil stroke. The forward edge of the crevice pin 165 is beveled so that the bolt forces the crevice pin out of engagement when the bolt returns to battery and strikes the barrel, while the sleeve 31 is still moving forward in counter-recoil.

An extractor claw 168 extends forward of the bolt to grip the lip 169 of a cartridge case. The claw 168 is connected to the bolt by a pivot pin 170 and urged into the gripping position by a spring 171. A beveled surface 172 on the leading edge of the claw causes it to ride up over the lip of a cartridge as the bolt moves forward to engage a cartridge. A firing pin 173 is affixed to the rear end of the bolt carrier sleeve by a pin 178 held in place by the walls of the receiver 6. The firing pin 173 extends slideably through a bore 174 in the bolt. A cartridge ejecting rod or pin 175 also extends slideably through a bore 176 in the bolt and an arcuate aperture 177 (see FIG. 12) in the rear end of the bolt carrier sleeve. The ejecting pin 175 is caught between the bolt and carrier sleeve by an enlarged shoulder 180 formed intermediate its ends and accommodated by aligned recesses in the bolt and sleeve.

Referring particularly to FIGS. 15 and 19 the buffer assembly 38 at the rear of the receiver includes a plurality of annular cup or Belleville springs 182 stacked in series and aligned with the bolt carrier sleeve 31. The Belleville springs 182 are housed in a cylindrical sleeve 183 mounted for longitudinal sliding movement at the rear of the receiver. The sleeve has an integral rear end plate 184 which abuts the back plate 185 of the receiver. A plunger 186 is longitudinally slideable in the forward end of the sleeve and is held against the Belleville springs by a stop or screw 187 slideably extending through the plunger 186 and end plate 184 and threaded into the back plate 185 of the receiver. The screw may be tightened or loosened, as desired, to adjust the pre-loading of the Belleville springs 182.

As the bolt carrier nears the end of its recoil stroke, the rear face 190 of the bolt carrier sleeve engages the plunger 186 and compresses the Belleville springs 182 rearwardly against the end plate 184 of the buffer sleeve to gradually stop the recoiling bolt and bolt carrier. The Belleville springs then expand and shoot the bolt and bolt carrier forward to the battery position for firing another round.

The sear 41 is pivotally mounted on the lower side of the buffer sleeve intermediate the ends of the sleeve by a pin 192 extending through apertures in a pair of lugs 193 affixed to the sleeve. A compression spring 194 engaged between sleeve 183 and the sear urges the sear downward into engagement with the sear notch 42 formed in the upper surface of the bolt carrier body 32 near the rear end of the body.

The trigger 40 is mounted on the rear plate 185 of the receiver by a pivot pin 195. The trigger has a forward portion 44 which extends into a notch 45 formed in the rear end of the carrier body 32 (FIG. 27) so that the forward portion of the trigger underlies the sear. The trigger may be activated manually or by a solenoid 196 to hold the sear up out of engagement with the sear notch so that the bolt carrier will return to the battery position. If the trigger is released, the spring 194 urges the sear downward to engage in the sear notch and interrupt the counter-recoil stroke of the bolt carrier, thereby holding the bolt carrier in the rearward cocked position. The sear force is buffered by the sleeve 183 compressing the Belleville springs 182 forward against the screw head 188 and plunger 186 as the sleeve 183 slides forward in the receiver (FIG. 16).

Referring particularly to FIGS. 7, 9 and 13, a long operating spring 200 extends through an opening 201 in the bolt carrier body 32 and is compressed between the back plate 185 of the receiver and the forward part of the bolt carrier body 32 to drive the bolt carrier forward. The operating spring 200 is guided on a rod 202 which is affixed to the back plate of the receiver by a pin 203 and extends slideably through a bore 204 in the front end of the carrier body 32. A keeper 233 is slideable on the rod 202 and is retained by an enlarged head 234 on the forward end of the rod. The forward end of the guide rod 202 extends into the open rear end 107 of the accelerator piston 93 to support the rod when the bolt carrier is rearward from the battery position.

A charging system is provided for pulling the bolt carrier from the battery position rearward to the cocked position. As seen in FIGS. 1, 2 and 7 through 12, the charging system includes a chain 205 which is nested between the pairs of bolt carrier legs 148, 149 and extends along the receiver through a central way 206 formed in the bottom plate 151 of the receiver 6. The forward end of the chain is connected to a charging block 207 which freely engages the forward end of the bolt carrier body 32 as the chain is pulled rearwardly. The block 207 travels along the way 206 on a guide rod 208 which extends through an aperture 209 in the block into an aperture 210 at the forward end of the receiver. The rear end of the charger guide rod is affixed to the receiver by a support 211 extending up from the bottom plate. The chain is engaged by a sprocket 215 journaled on the bottom plate at the rear of the receiver. The sprocket may be rotated by a removable manual crank 216 (see FIGS. 1 and 17), or by a powered means (not shown). An elongate spring 220 is guided on the rod 208 and returns the block 207 to the forward position.

Referring to FIGS. 13 and 17, the back plate 185 of the receiver is connected to the receiver by upper and lower removable pins 217 extending through ears 218 on the receiver and brackets 214 on the back plate. With the pins 217 removed, the back plate may be removed from the receiver along with the trigger 40, the solenoind 196, the buffer 38, sear 41 and the bolt carrier operating spring 200 and guide rod 202, all of which are attached to the back plate. The bolt 28 and bolt carrier 29 are then free to be pulled out the rear of the receiver whereupon the various pins 162, 178 are no longer retained by the surfaces of the receiver and the bolt is easily removed from the carrier and disassembled.

As is shown most clearly in FIGS. 1, 11, 20–23, 25 and 27, the ammunition feeding means 7 includes similar right and left hand ammunition guides or feeding trays 228, 229 disposed on opposite sides of the receiver 6 at the feeding station 30. Each of the feeding trays 228, 229 guides rounds 27 of ammunition from a different store to the feeding station 30.

The two ammunition feeding trays 228, 229 are pivotally attached to the receiverd by a pair of vertical mounting rods 219 forward of the tray, each extending through upper and lower ears 221 on the trays and upper and lower brackets 223 on the receiver. As seen in FIG. 11, typically each mounting rod 219 has an upper portion 222 spring loaded in telescoping relationship with a lower sleeve portion 224. The two feeding trays are interconnected or ganged at their rear ends by upper and lower horizontal connecting bars 225, 226 which slide through corresponding keyways 227 transverse to the receiver as the trays pivot about the forward mounting rods 219. The connecting bars 225, 226 are connected to the trays by vertical rear mounting rods 230 which are similar to the front mounting rods 219 and which extend through aligned apertures in the bars and in upper and lower brackets 232, 235 extending rearwardly from the respective trays. Each of the feeding trays can be removed from the receiver by telescoping the mounting rods 219, 230 to remove them from the respective brackets.

In FIGS. 20–23, 25 and 27 the right-hand tray 228 is shown in the operative or feeding position adjacent the receiver, and the left-hand tray 229 is pivoted away from the receiver to the disengaged position. A selector is provided for pivoting one or the other of the ganged ammunition feeding trays to the operating position to select feed from either of the ammunition stores. The selector includes a selector handle 236 pivotally connected by a telescoping mounting rod 237 to brackets 238, 239 fixed on the receiver rearward of the right-hand tray. The selector handle 236 is operably connected to the right rear tray-mounting rod 230 by upper and lower angle selector levers 240, 241 which pivot with the selector handle 236 about the selector mounting rod 237. One end of each lever 240, 241 is affixed to the selector handle 236, and the other end has a forward opening slot 242 which receives the end of the right rear ammunition tray mounting rod 230. As the selector handle is pivoted rearwardly about the selector mounting rod 237, the angle levers 240, 241 cause the ammunition feeding tray connector bars 225, 226 to move to the right, thus pivoting the right-hand ammunition feeding tray laterally out of the operable position and the left-hand ammunition feeding tray laterally into the operable position, as is shown in phantom in FIG. 20.

A trigger-type latch 245 (see also FIG. 17) housed in the selector handle and pivotally mounted thereon at 246, has an arm 247 with an indexing tab 248 on its upper side to engage in any of three indexing notches 249, 250, 251 in the upper bracket 238. Thus, the ammunition feeding trays are pivoted so that the right-hand tray is in operable position when the forward notch 249 is engaged, the left-hand tray is in operable position when the rearward notch 251 is engaged, and both trays are out of operable position when the intermediate notch 250 is engaged (see FIG. 28). The latch 245 is urged into the engaging position by a spring 252 interior of the selector handle and is released by squeezing a depending arm 253.

As the type of ammunition in one tray may have different ballistic characteristics than the ammunition in the other tray, means are provided for adjusting a gunsight reasponsive to the selection of a feed tray. The sight includes a forward bead 255 and a rear peep sight blade 256. Referring particularly to FIGS. 14 and 25, rear sight blade 256 is mounted for vertical sliding movement in a channel shaped bracket 254 fixed atop the receiver with the forward side of the bracket being open. A cam follower 257 on the sight blade engages in a cam slot 258 formed in a horizontal channel bracket 259 fixed on the connector bar 225 and abutting the front face of the vertical bracket 254, so as to raise the rear sight when the left tray is operative and lower the rear sight when the right tray is operative in accordance with the predetermined different ballistic characteristics of the two types of ammunition.

Figure 22:
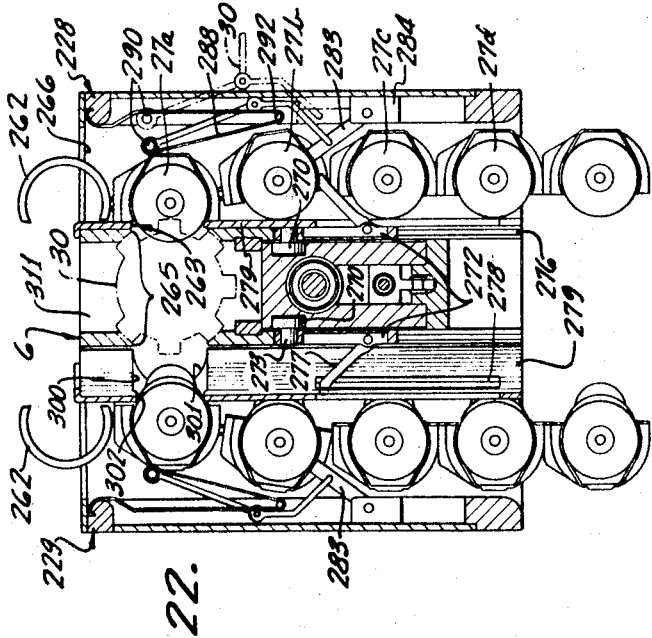
FIG. 22 is a sectional view taken generally along lines 22—22 of FIG. 20.
Figure 23:
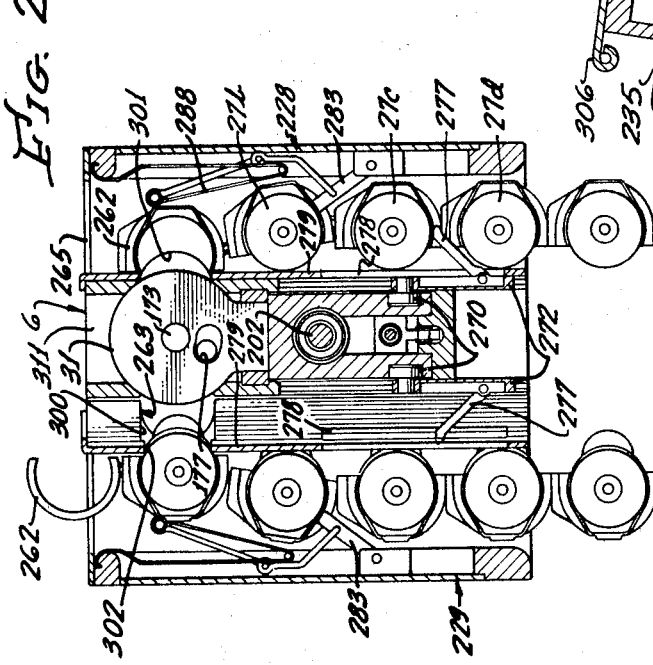
FIG. 23 is a sectional view taken along the same lines as FIG. 22, but showing the bolt and bolt carrier in the forward position.

Referring to FIGS. 22–24 the rounds of ammunition 27 are interconnected by an exemplary disintergrating link 262, the details of which do not form a part of this invention except as the links cooperate with the gun and feeding means of this invention. The belts of ammunition of each store are fed up through the ammunition trays alongside the receiver and then laterally inward through side discharge openings 263 in each tray and through opposite side openings 265 in the upper portion of the receiver which define the feeding station 30 of the receiver From the ammunition feeding station, the rounds of ammunition are stripped and chambered by the reciphrocating bolt as will be described hereinafter. The links 262 continue upward through top openings 266 in the top of each ammunition feeding tray where they separate from the belt and fall from the gun.

The ammunition feeding means 7 includes similar cam rollers 270 which cooperate with similar elongate inclined cam slots 271 formed on opposite sides of the bolt carrier body 32 to operate the feeding mechanism. The bolt carrier body 32 and cam slots 271 are longer than the stroke of the bolt carrier so the cam followers 270 remain in the slots 271 throughout the stroke. The feeding mechanisms on opposite sides of the receiver are similar; hence, similar reference numerals will be used for the corresponding parts of both.

Referring to FIG. 25, as well as to FIGS. 22 and 23, each cam follower 270 is approximately centered at the feeding station 30 (see FIG. 2) and is rotatably mounted on a pawl carrier 272 by a horizontal axle 273 near the longitudinal center of the carrier. Each of the pawl carriers 272 is interposed between the bolt carrier body 32 and one of the ammunition feeding trays. The pawl carrier 272 reciprocates vertically toward and away from the feeding station in a rectangular opening 274 formed in the side of the receiver. Elongate tongues 275 on the forward and rear edge of the pawl carrier engage in corresponding vertical grooves 276 in the side of the receiver to guide the pawl carrier in its vertical reciprocation. A pair of similar feed pawls 277 are each pivotally mounted on the pawl carrier, one forward of the cam follower 270 and one rearward. The pawls 277 are spring biased outward to protrude through vertical slots 278 in the inboard sides 279 of the corresponding ammunition feeding trays and engage the rounds of ammunition contained in the tray. The pawls are free to pivot upwardly but downward pivoting of the pawls is limited by the lower end of each pawl abutting the inner wall 280 of the pawl carrier.

As the bolt carrier moves forward the feed pawls 277 reciprocate downward from the position shown in FIG. 22 to that shown in FIG. 23, being cammed inwardly by a round of ammunition 27c as they pass it. When the bolt carrier is in its forward position, the feed pawls are beneath the round of ammunition 27c to be engaged because the pawl springs 282 have biased the pawls outward. The pawls raise the round 27c in the ammunition tray as the bolt carrier returns rearward.

A pair of identical inwardly extending, spring loaded retaining pawls 283, only one of which is shown in FIG. 25, are pivoted up out of the way by the round of ammunition 27c as it rises. Then the retaining pawls return beneath the raised round 27c to retain it in place while the feed pawls reciprocate downward to engage the next round 27d. The retaining pawls are each pivotally mounted on a support 284 which is on the outboard side of the feeding tray, and are biased inward by springs 285 to engage the rounds. Downward pivoting of the retaining pawls is limited by abutment of their lower ends 286 (see FIG. 26) against the support 284.

An upwardly and inwardly extending plate spring 288 guides the upper round 27a laterally to the feeding station 30, from where it is stripped, chambered and fired. One end of the guide spring 288 is affixed to a rod 290 extending between a pair of spaced guide arms 291 (see also FIG. 26). The other end is attached to the upper end of the ammunition tray; and the center of the plate is bent around a rod 292 which is fixed to the support 284 and on which the guide arms 291 are pivotally mounted.

The side opening 263 in each tray has a rear portion 302 which is narrower than the diameter of the rear part of the round 27 and a forward portion 300 which is wider than the widest part of the round 27. The opening 263 is contiguous with an opening 301 in the forward wall of the tray. The raised round 27 is held in the tray since it cannot pass completely through the narrow rear portion 302 of the opening. However, the round 27 does protrude far enough through the side opening 263 of the tray, under the urging of spring plate 288, that if the tray is in the operating position, the bolt 28 engages the rear of the round as the bolt comes forward. The bolt 28 strips the round 27 out of the links 262 and rams the round forward and inward through the forward portion 300 of the side opening 263 and the opening 301 into the chamber of the barrel.

The empty links 262 are guided up out of the openings 266 in the top of the ammunition trays by forwardly and rearwardly extending tabs 293 on the links (see FIG. 24) which engage in vertical guide grooves 294 in the upper end of the spaced guide arms 291.

A positioning stop 295 engages the round 27a at the feeding station 30 to positively limit upward movement of the round and fix it at the feeding station. This stop is pivotally mounted about a horizontal transverse axis on the upper plates 296 of the ammunition tray so that as the round moves forward to the chamber, the stop is cammed forward out of the way by the cartridge case. A spring 297 returns the stop to its operative position. The forward end of the round is guided into the chamber by a ramp guide 299 on the forward end of the ammunition tray and tapered surfaces 298 on the locking teeth 161 adjacent opposite sides of the barrel extension (see FIG. 21).

When an ammunition tray is pivoted to the inoperative position, as for example the left-hand tray in FIGS. 22 and 23 and both trays in FIG. 28, the feed pawls will continue to reciprocate vertically as the bolt carrier reciprocates, but the rounds of ammunition in the tray are far enough outboard of the feed pawls that the pawls do not engage the rounds, and no ammunition is fed from that tray. The top round is held in the tray since it cannot pass through the rear portion 302 of the side opening 263 far enough to be engaged by the bolt. Since the retaining pawls are part of the tray they remain effective to support the rounds in the ray so it is ready to feed ammunition when pivoted to the operative position.

The outboard side plate 303 of each ammunition tray is designed to be opened for access to the interior of the tray. The side plate is pivotally attached to the forward vertical mounting rod 219 by a bracket 304 affixed to the forward end of the side plate and having ears 305 through which the mounting rod is inserted. The rear edge 306 of the side plate extends rearward of the ammunition feeding tray so that it may be gripped to pivot the side plate to the open position.

With the side plate open, the ammunition in the tray may be removed by pulling upwardly on a U-shaped release handle 307. The release handle 307 is an extension of a U-shaped connector 309, the ends of which are attached around the guide plate support rod 290. As the release handle 307 is pulled, the guide arms 291 pivot outwardly to pull the guide plate spring 288 away from the rounds of ammunition as shown in phantom in FIG. 22. The release handle is also connected to the retaining pawls 283 by wires 308 attached to the connector 309. The wires 308 pull the retaining pawls outwardly from under the rounds of ammunition when the release handle 307 is pulled. The rounds can then be pulled downward out of the tray to unload the gun.

The operation of the gun can best be understood by following through a complete firing cycle beginning with the gun in the firing position shown in FIG. 2. When the round is fired, the barrel 5 recoils rearwardly in the receiver 6. The recoil piston 73 which is affixed to the barrel moves rearwardly in the stationary recoil cylinder 70 as the barrel recoils, thereby driving the accelerator piston 93 rearwardly. Since the cross-sectional area of the recoil piston head 75 is larger than that of the accelerator piston head 95, e.g. by a ratio of three to two, the accelerator piston moves rearward faster than the barrel and recoil piston.

The rear end of the accelerator piston rear extension 107 engages the forward end of the bolt carrier body 32 to drive the bolt carrier rearward at an accelerated rate relative to the barrel. When the barrel has completed an initial part of its recoil, e.g. one-half inch, the accelerator piston 93 has moved rearward a sufficient distance, e.g. three-quarters of an inch, to bottom out in the recoil cylinder 70, as shown in FIG. 7. By that time the accelerator piston has imparted sufficient momentum to the bolt carrier 29 to send the bolt carrier and bolt 28 rapidly to the rear of the receiver. Also by then, the forward faces of the recoil piston head 75 has passed the forward edge of the wedge-shaped throttling groove 110 in the cylinder wall, so that the groove becomes effective to pass fluid around the recoil piston head. The throttling groove decreases in cross-sectional area in the rearward direction, so that the quantity of fluid which passes through it decreases at a programmed rate as the recoil piston moves rearward, thereby cooperating with the recoil spring 98 to buffer the recoil force of the barrel and bring the barrel and recoil piston to a stop with the recoil piston slightly spaced from the accelerator piston forward extension 101, and the barrel extension 48 slightly spaced from a shoulder 310 on the receiver, as shown in FIG. 8.

As is shown in FIG. 7, during the first part of the recoil cycle, the bolt 28 is locked to the barrel by the locking teeth 160, 161 while the bolt carrier moves rearward at a faster rate than the bolt and barrel and the bolt cam follower pin 162 moves through the rearward axial portion of the bolt carrier sleeve cam slots 163. By the time the bolt carrier has traveled rearwardly with respect to the barrel and bolt sufficiently so that the cam follower 162 of the bolt enters the central portion of the cam slots 163 to rotate the bolt to the unlocked or aligned position, the residual pressure in the barrel chamber has been somewhat dissipated, thereby reducing the friction between the teeth 160, 161 of the bolt and barrel. After the bolt is in the aligned or unlocked position a further short dwell period occurs while the cam pin 162 moves through the forward portion of the sleeve cam slots 163. As the cam pin engages the forward end of the cam slots, the bolt moves rearward with respect to the barrel and the extracting claw 168 which is engaged with the lip of the expended cartridge, extracts the cartridge from the chamber and carries it rearward with the bolt. Extraction of the cartridge from the chamber occurs between the positions illustrated in FIGS. 7 and 8 so that the barrel is still recoiling, even though it is in its deceleration phase. Thus, the relative velocity between the bolt and the barrel as the cartridge is removed, is less than if the barrel were stopped, so that removal of the cartridge is eased.

When the bolt 28 begins to move rearward away from the barrel, the bolt carrier sleeve 31 is rearward with respect to the bolt, and the crevice pin 165 is urged upward by the spring 164 into the notch 166. After the bolt leaves the barrel, the ramping pin 167 holds the crevice pin engaged in the notch to keep the bolt in the aligned position until its locking teeth 160 are again engaged in those 161 of the barrel.

Referring now to FIG. 9, as the bolt and bolt carrier continue rearward with the cartridge case, the recoil spring 98 and accelerator spring 100 urge the accelerator piston 93, recoil piston 73 and barrel 5 forward in counter-recoil to the position shown in FIG. 2. During the initial part of the counter-recoil cycle of the barrel, fluid passes the recoil piston head 75 both through the wedge-shaped throttling groove 110 and through the orifices 123 as the one way flapper valve 122 in the recoil piston head opens (see FIG. 3a). After the recoil piston head moves forward of the throttling groove 110, only the orifices 123 are effective to pass fluid through the piston head 75, and therefore the recoil piston is throttled down. The orifices 123 are sized to permit the barrel to counter-recoil fast enough to be in battery before a new round is stripped, but slow enough to reduce the impact at the end of the counter-recoil stroke. As the counter-recoil cycle of the barrel is completed, the recoil piston 75 head abuts the counter-recoil Belleville springs 127 in the recoil cylinder to buffer the counter-recoil force of the barrel and bring it to a stop.

Meanwhile, the bolt and bolt carrier have reciprocated to the rearward position shown in FIG. 13 where the expended cartridge is immediately below an ejection port 311 in the upper side of the receiver, and the ejecting pin 175 abuts the plunger 186 of the rear buffer assembly. As the bolt carrier continues rearward from the position of FIG. 13 to that of FIG. 14, the bolt 28 and bolt carrier 29 move rearward with respect to the ejecting pin 175, causing the forward end of the ejecting pin to strike the expended cartridge throwing it loose from the pivotal claw 168 and upward out of the ejection port 311. The Belleville springs 182 buffer the ejection force.

The rear face of the bolt carrier sleeve 31 engages the plunger 186 causing the Belleville springs to compress rearwardly, thereby buffering the recoil force of the bolt and bolt carrier. As shown in FIG. 15, after the recoil of the bolt and carrier is stopped, the Belleville springs 182 expand and push the bolt carrier forward. If the sear 41 is in the lowered position, as shown in FIG. 15, it engages in the sear notch 42 of the bolt carrier to stop the forward movement of the bolt carrier. As shown in FIG. 16, the sear force is buffered by the Belleville springs 182 of the buffer assembly, since the bolt carrier forces the sear 41 and buffer sleeve 183 forward to compress the Belleville springs forwardly against the screw head 188. The parts then come to rest in about the position illustrated in FIG. 15.

As the bolt carrier reciprocates rearwardly in recoil, the ammunition feeding pawls reciprocate upward from the position shown in FIG. 23 to that shown in FIG. 22, thereby raising a round of ammunition 27a up and into the feeding station in front of the bolt as shown in FIGS. 20 and 22.

Figure 21:
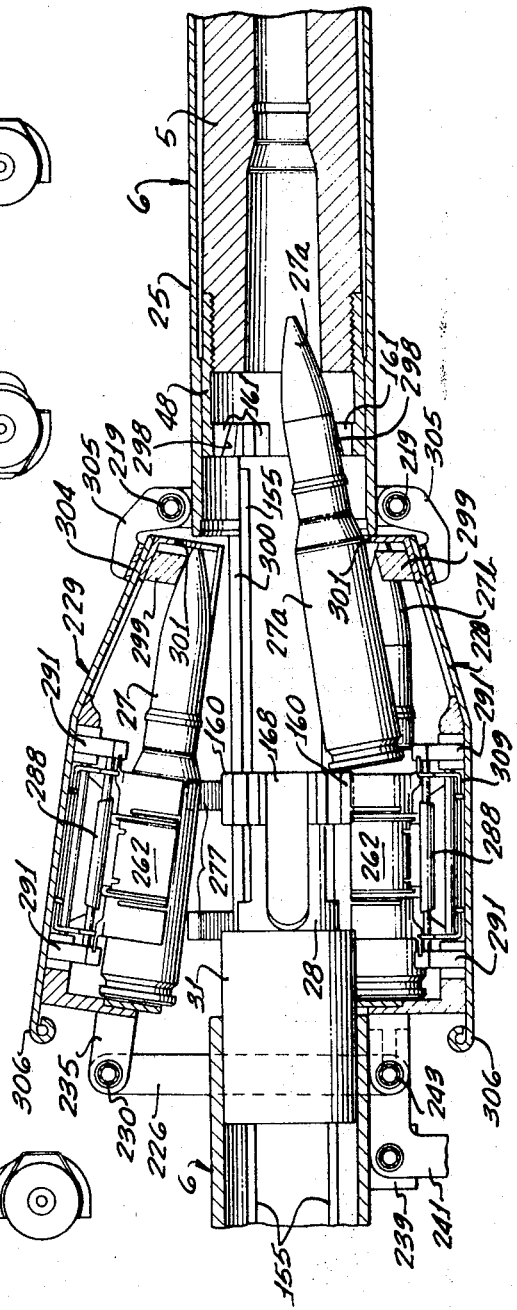

If the sear 41 is disengaged by the trigger 40, or was not in the lowered position at the end of the recoil stroke, the bolt carrier is returned forward to the battery position by the Belleville springs 182, and the bolt carrier operating spring 200. As the bolt and bolt carrier move farward, the bolt 28 engages the rear of the round of ammunition 27 at the feeding station, as shown in FIGS. 21 and 27, and rams the round forward into the chamber of the barrel.

As the bolt and bolt carrier continue forward toward the position of FIG. 2, the bolt teeth 160 pass through the locking teeth 161 of the barrel extension and then engage the barrel itself to stop forward movement of the bolt. The bolt carrier 29, however, continues forward, camming the crevice pin 165 out of the notch 166, and rotating the bolt 28 to the locking position as the bolt cam pin 162 passes through the central portion of the sleeve cam slots 163. When the bolt carrier reaches the position illustrated in FIG. 2, the forward end of the bolt carrier sleeve 31 strikes the rear end of the barrel extension 48 to stop the bolt carrier. The counter-recoil momentum of the bolt carrier is transmitted through the relatively heavy barrel and the recoil piston 73, and is buffered by the Belleville springs 127 in the recoil cylinder. At the same time, the firing pin 173 is driven by the bolt carrier through the opening 174 in the bolt to strike the round of ammunition and fire it, thereby causing the cycle to be repeated.

Referring to FIG. 22, the rounds of ammunition from the right and left feeding trays 228, 229 enter the feed station from opposite quadrants with respect to the barrel axis, while the empty cartridges are ejected upward into a third quadrant, and the bolt carrier body 32 extends downward into a fourth quadrant. Thus, interference between the fast moving bolt carrier 29 and the rounds 27 is avoided.

It is indicative of the velocities, and forces involved in the operation of this gun, that a typical gun in accordance with this invention is designed to fire 25 mm. shells at approximately 700 rounds per minute, using a barrel weighing approximately 50 pounds and a bolt carrier of approximately 12 pounds reciprocating at a velocity of about 45 feet per second.

Referring now to FIG. 29, an alternative embodiment of the recoil and accelerator mechanism is shown. That embodiment includes a recoil cylinder 312 and recoil piston 313 connected to the barrel 5 and receiver 6 in substantially the same manner as the recoil cylinder 70 and piston 73 of FIGS. 3a and 3b. The recoil cylinder 312 does not contain hydraulic fluid, however. An accelerator lever 314 is pivoted in the receiver at 315 and engages the forward end of the bolt carrier body 32. An accelerator piston rod 316, which extends rearward from the recoil piston head 317, is pivotally connected to the arm at 318 by a link 319. The ratio of the distance between the two pivotal connections 315, 318 on the arm, and the length of the arm, is selected to obtain the desired rate of acceleration of the bolt carrier body 32 relative to the barrel 5.

The recoil piston head 317 moves rearwardly in recoil with the barrel and during the initial part of the recoil, is resisted only by a relatively weak compression spring 320 rearward of the piston head. After the recoil piston head 317 has moved rearwardly a selected initial distance, it engages a plunger 322 which abuts a plurality of Belleville springs 323 stacked in series-parallel to form a relatively strong spring which buffers the recoil force of the barrel 5 and returns the barrel to the forward position while the bolt carrier 29 continues rearward. Counter-recoil of the barrel is buffered by the forward Belleville spring 324 as in the embodiment of FIGS. 3a and 3b. The spring and link-type buffering and accelerator system, as illustrated in FIG. 28, is usable in small weapons where the recoil and counter-recoil forces, and the weight of the barrel and bolt carrier are less in the gun illustrated in FIG. 2.

FIG. 30 illustrates a control circuit for controlling the rate of fire of the automatic gun, for example between full automatic and semi-automatic. Frequently full automatic firing is desirable when using high explosive rounds of ammunition. For armor piercing rounds however it is usually desirable to fire semi-automatic so that the gun can be aimed for each round.

As can be seen in FIG. 20, a normally open selector switch 330 has an arm 331 engageable by the selector lever 241 to close the switch when the selector lever is pivoted to the phantom line position, thus moving the left-hand ammunition feeding tray 229 containing high explosive rounds into operative relationship with the bolt and feed pawls and moving the right-hand ammunition feeding tray 28 containing armor piercing rounds out of operative position. This prepares the gun for automatic fire.

As seen in FIG. 30, the manual depression of a firing button 332 located at a remote control station 334 will continue to energize the firing solenoid 196 from a battery 336 for so long as the firing button 332 remains depressed, provided that the selector switch 330 is closed. This is the automatic firing condition.

If, however, the selector switch 330 is in its normally open condition for semi-automatic firing of armor piercing rounds from the right-hand feeding tray, the depression of the firing button 332 at the control station energizes the firing solenoid 196 only through the normally closed contact 339 of a control relay 341. The control relay 341 is energized by depressing the firing button 332, however it is relatively slow acting compared to the firing solenoid 196, the timed relationship being such that the firing solenoid 196 actuates the trigger 40 to fire a single round prior to the opening of the normally closed contact 339 of the control relay.

Thus, the selector switch 330 and associated circuitry, being responsive to position of the selector lever 241, provides a means for controlling the firing rate of the gun in accordance with the ammunition store selected.

I claim:
1. An automatic gun comprising, in combination,
   (a) a receiver;
   (b) bolt means adapted to reciprocate longitudinally in said receiver, said bolt means having a sear notch thereon;
   (c) a buffer assembly mounted at the rear of the receiver for buffering recoil force of the bolt means, said buffer assembly including
      spring means disposed in alignment with the bolt means,
      a sleeve housing said spring means and mounted for longitudinal sliding movement in the receiver, said sleeve being engageable with the rear of the receiver to limit rearward movement,
      an end plate affixed on the sleeve and abutting the rear end of the spring means,
      a plunger mounted for longitudinal movement within the sleeve, said plunger abutting the forward end of the spring means and being engageable by the rear end of the bolt means,
      and a stop fixed to the receiver for limiting forward movement of the plunger, including a screw slideably extending through the plunger, the spring means, and the buffer sleeve end plate, said screw being threaded into the rear of the receiver for adjustably pre-loading the spring means; and
   (d) a sear selectively engageable with the sear notch on the bolt means for interrupting the forward stroke of the bolt means, said sear being affixed to the sleeve for buffering sear forces resulting from interrupting the counter-recoil of the bolt means.

References Cited
UNITED STATES PATENTS 3,198,075 8/1965 Maillard.
2,108,026 2/1938 Sutter et al. _____ 89—198 X BENJAMIN A. BORCHELT, Primary Examiner S. C. BENTLEY, Assistant Examiner

UNITED STATES PATENT OFFICE
CERTIFICATE OF CORRECTION

Patent No. 3,517,586　　　　　　　　Dated June 30, 1970

Inventor(s) Eugene M. Stoner

It is certified that error appears in the above-identified patent and that said Letters Patent are hereby corrected as shown below:

```
Col.  2, line 46 - after "includes" delete "a"
Col.  9, line 35 - "receiverd" should be --receiver--
Col. 10, line 45 - "reciphrocating" should be --reciprocating--
Col. 11, line 62 - "plates" should be --plate--
Col. 12, line  8 - "ray" should be --tray--
Col. 12, line 56 - "faces" should be --face--
Col. 13, line 43 - "oriflces" should be --orifices--
Col. 14, line 14 - "farward" should be --forward--
Col. 15, line 24 - "28" should be --228--
```

SIGNED AND
SEALED
NOV 17 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,517,586           Dated June 30, 1970

Inventor(s) Eugene M. Stoner

It is certified that error appears in the above-identified patent and that said Letters Patent are hereby corrected as shown below:

```
Col.  2, line 46 - after "includes" delete "a"
Col.  9, line 35 - "receiverd" should be --receiver--
Col. 10, line 45 - "reciphrocating" should be --reciprocating--
Col. 11, line 62 - "plates" should be --plate--
Col. 12, line  8 - "ray" should be --tray--
Col. 12, line 56 - "faces" should be --face--
Col. 13, line 43 - "oriflces" should be --orifices--
Col. 14, line 14 - "farward" should be --forward--
Col. 15, line 24 - "28" should be --228--
```

SIGNED AND
SEALED
NOV 12 1970

(SEAL)
Attest:

Edward M. Fletcher, Jr.
Attesting Officer

WILLIAM E. SCHUYLER, JR.
Commissioner of Patents